United States Patent
Yen (10) Patent No.: US 12,328,005 B2
(45) Date of Patent: Jun. 10, 2025

(54) GREEN POWER SYSTEM

(71) Applicant: Ming-Chou Yen, Nantou (TW)

(72) Inventor: Ming-Chou Yen, Nantou (TW)

(73) Assignees: DALI TECHNOLOGY CO., LTD., Tainan (TW); LanCore Intelligence Co., Ltd., Hsinchu (TW); LanCore System Co., Ltd., Hsinchu (TW)

( * ) Notice: Subject to any disclaimer, the term of this patent is extended or adjusted under 35 U.S.C. 154(b) by 0 days.

(21) Appl. No.: 18/203,728

(22) Filed: May 31, 2023

(65) Prior Publication Data

US 2024/0305106 A1   Sep. 12, 2024

(30) Foreign Application Priority Data

Mar. 10, 2023   (TW) .................................. 112109033

(51) Int. Cl.
  *H02J 3/38* (2006.01)
  *H02S 40/32* (2014.01)
  *H02S 40/38* (2014.01)

(52) U.S. Cl.
  CPC .............. *H02J 3/381* (2013.01); *H02S 40/32* (2014.12); *H02S 40/38* (2014.12); *H02J 2300/24* (2020.01)

(58) Field of Classification Search
  CPC ....... H02J 3/381; H02J 2300/24; H02S 40/32; H02S 40/38
  See application file for complete search history.

(56) References Cited

U.S. PATENT DOCUMENTS

| | | | |
|---|---|---|---|
| 11,258,298 B2* | 2/2022 | Motsenbocker | H05B 45/14 |
| 11,601,898 B2* | 3/2023 | Lee | H04B 1/1607 |
| 2011/0080047 A1* | 4/2011 | Li | H02J 1/12 |
| | | | 307/44 |
| 2016/0141879 A1* | 5/2016 | Motsenbocker | G05F 1/67 |
| | | | 307/130 |
| 2019/0074695 A1* | 3/2019 | Motsenbocker | F24H 1/185 |
| 2020/0119567 A1* | 4/2020 | Bintz, II | H02S 40/32 |

* cited by examiner

*Primary Examiner* — Carlos Amaya (57) ABSTRACT

A green power system includes at least one solar panel, an auto-switch uni-directionally connected to the solar panel, a grid/generator uni-directionally connected to the auto-switch, at least one equipment with AC/DC uni-directionally connected to the auto-switch, and a solar charge controller installed to the auto-switch, or bi-directionally and electrically connected between the solar panel and the auto-switch, or installed to the equipment with AC/DC, and the solar charge controller is bi-directionally and electrically connected to at least one power storage device.

15 Claims, 7 Drawing Sheets

GREEN POWER SYSTEM

BACKGROUND OF THE INVENTION

Technical Field of the Invention

The present disclosure relates to a system, more particularly relates to a green power system that directly connects a solar panel, a grid/generator and an equipment with AC/DC to an auto-switch in a uni-directional manner to automatically switch and supply electric power to electrical equipment without requiring any solar photovoltaic inverter.

Description of the Related Art

Figure 1:
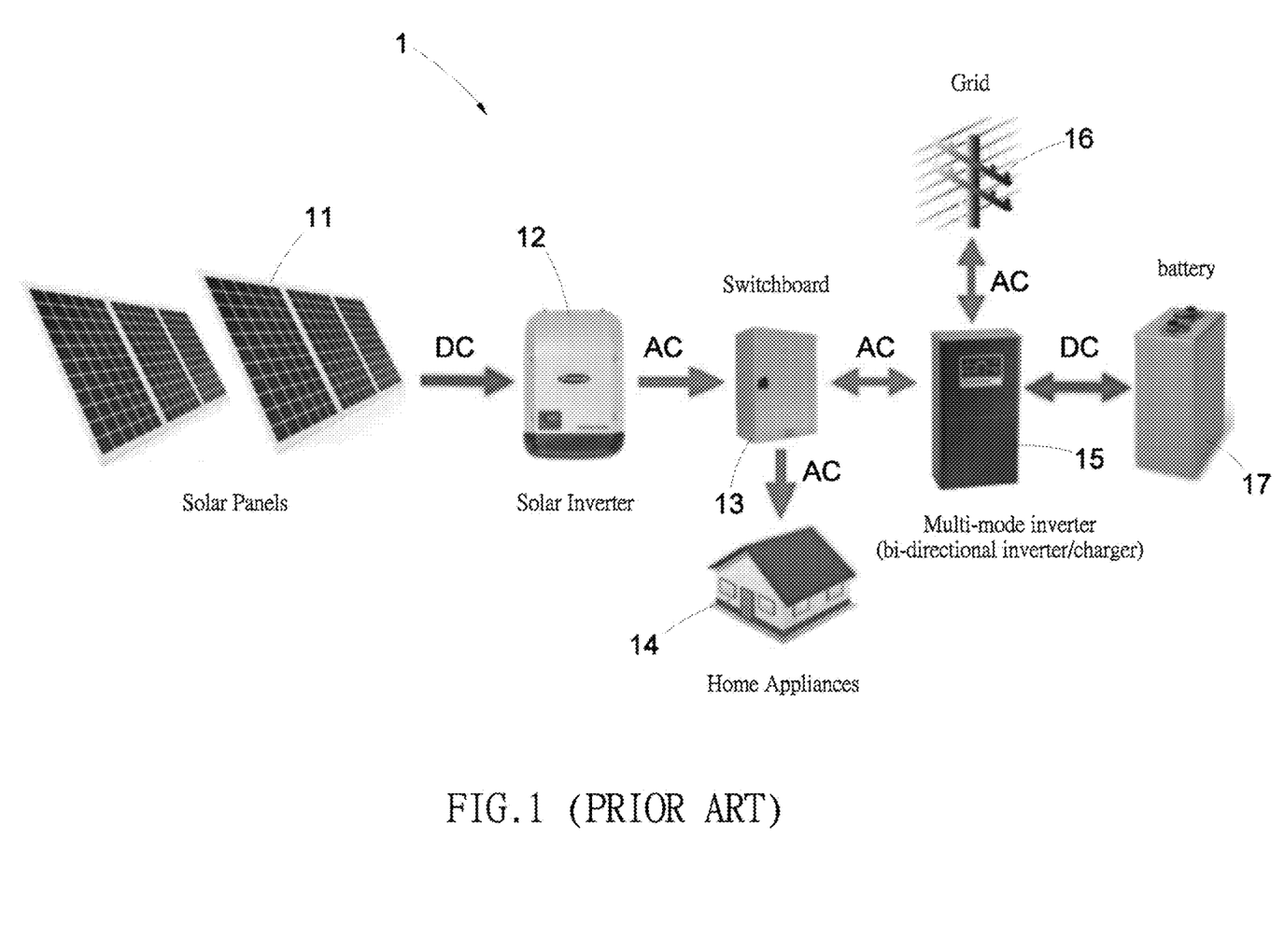
FIG. 1 is an architectural diagram of a conventional AC coupled hybrid grid-connected power system.

With reference to FIG. 1 for the architectural diagram of a conventional AC coupled hybrid grid-connected power system, the architecture of the AC coupled hybrid grid-connected power system 1 includes a solar panel 11, and a solar photovoltaic inverter 12 connected to the solar panel 11 and provided for converting direct current (DC) to alternate current (AC). The solar photovoltaic inverter 12 is further connected to a switchboard 13, and the switchboard 13 supplies the alternate current to an electrical equipment 14. The switchboard 13 is further connected to a bi-directional inverter 15 which serves a bi-directional inverter and a charger, and the bi-directional inverter 15 is connected to a grid 16 for bi-directionally supplying alternate current (AC) and a battery 17 for converting the alternate current (AC) and the direct current (DC) bi-directionally.

Figure 2:
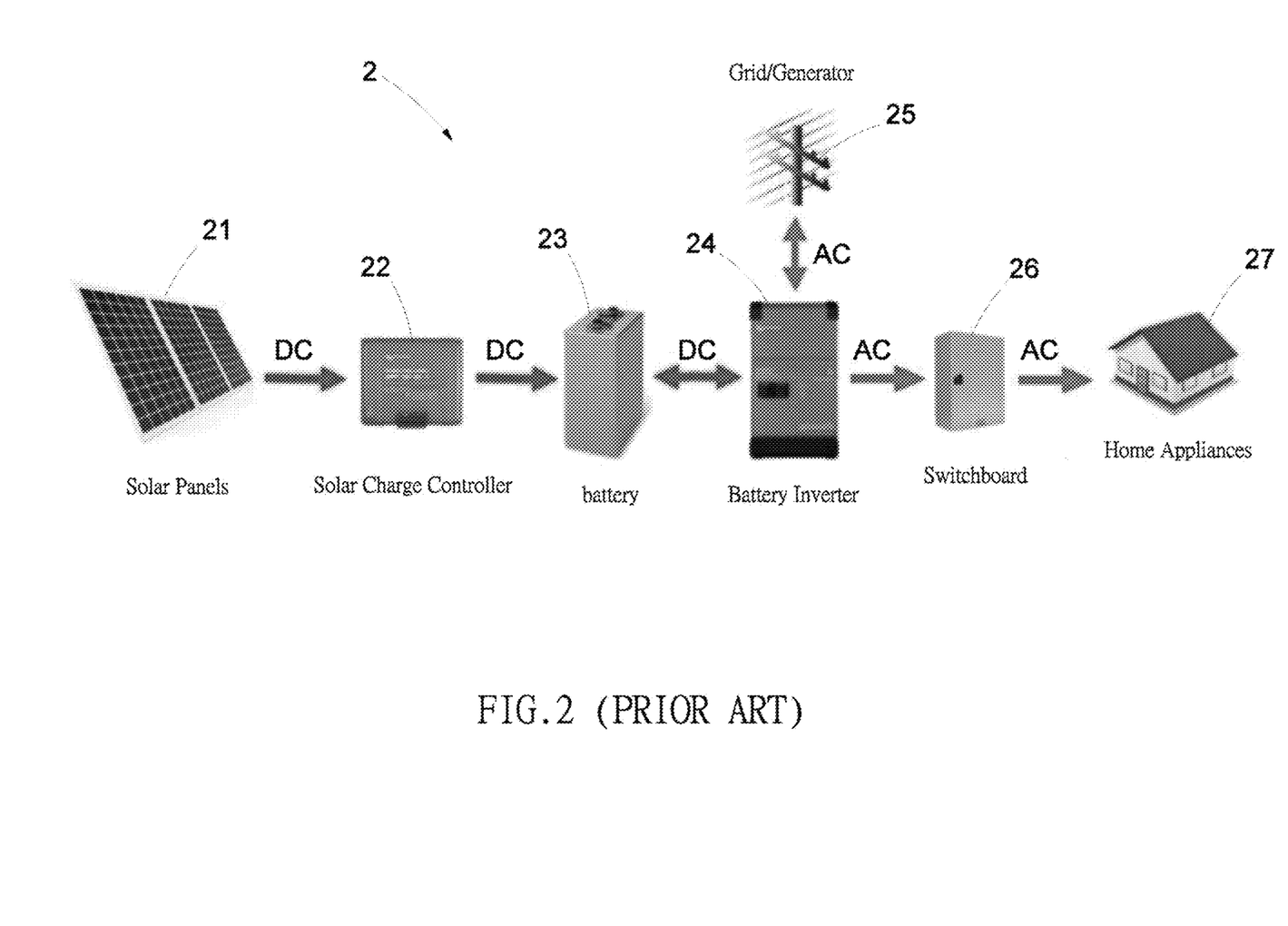
FIG. 2 is an architectural diagram of a conventional DC coupled grid-connected power system.

With reference to FIG. 2 for the architectural diagram of a conventional DC coupled grid-connected power system, the architecture of the DC coupled grid-connected power system 2 includes a solar panel 21, a solar charge controller 22 connected to the solar panel 21 for supplying direct current (DC), a battery 23 connected to the solar charge controller 22, a battery inverter 24 connected to the battery 23 for converting direct current (DC) and alternate current (AC) bi-directionally. The battery inverter 24 is connected to a bi-directional grid/generator 25 and provided for supplying alternate current (AC) and a uni-directional switchboard 26 provided for supplying alternate current (AC) and connected to an electrical equipment 27. The battery inverter 24 and the battery 23 bi-directionally supply the direct current (DC).

The foregoing two conventional power systems require to convert direct current (DC) to alternate current (AC) for several times and then convert alternate current (AC) to direct current (DC). In details, the solar photovoltaic inverter 12 is used to convert direct current (DC) to alternate current (AC), and the bi-directional inverter 15 is connected to the grid 16 to supply alternate current (AC) bi-directionally and the battery 17 is provided to convert direct current (DC) bi-directionally. Both conventional power systems need the conversion process to supply direct current (DC) to be fed to the battery 23 and the grid or generator 25 is used to supply alternate current (AC) to be fed into the battery inverter 24 of the electrical equipment 27, and these conventional power systems need to convert direct current (DC) to alternate current (AC) and then convert alternate current (AC) to direct current (DC) again, and such conversions will lower the overall efficiency and cause losses. These systems and the grid 16 or the grid/generator 25 are bi-directional, thus leading to backflows and damages to power distribution system and equipment, and the need of boosting the voltage. Therefore, these conventional power systems have the disadvantages of complicated structure, too-many conversion process equipment and high cost, and reduction of the practical use, which are what consumers desperately want to break through.

SUMMARY OF THE INVENTION

In view of the aforementioned shortcomings of the related art, it is a primary objective of the present disclosure to overcome the shortcomings of the related art by providing a green power system which includes a solar panel, an auto-switch, a grid/generator, and an equipment with AC/DC connected to one another.

A secondary objective of this disclosure is to provide a green power system having a solar charge controller bi-directionally connected between the auto-switch or the solar panel and the auto-switch or installed to the equipment with AC/DC, and the solar charge controller is connected to a power storage device.

A further objective of this disclosure is to provide a green power system that directly feeds the direct current of the solar panel to the equipment with AC/DC without requiring any solar inverter (Photovoltaic Inverter, PV inverter). Since it is not necessary to convert the direct current to alternate current or convert the alternate current to direct current, the efficiency can be improved.

Another objective of this disclosure is to provide a green power system with the effects of effectively simplifying the system and equipment, saving a plurality of conversion processes and devices, lowering costs and providing high energy storage efficiency.

The problem to be solved by this disclosure is described below. The structure of the conventional AC coupled hybrid grid-connected power system includes a solar panel connected to a solar photovoltaic inverter for supplying power and converting direct current (DC) to alternate current (AC). The solar photovoltaic inverter is connected to a switchboard, and the switchboard is provided for supplying the alternate current (AC) to an electrical equipment. The switchboard is connected to a bi-directional inverter which serves as a bi-directional inverter and a charger, and the bi-directional inverter is connected to a grid which supplies bi-directional alternate current (AC). The bi-directional inverter is also connected to a battery which converts direct current (DC) bi-directionally. The structure of the conventional DC coupled grid-connected power system includes a solar panel, a solar charge controller connected to the solar panel for supplying direct current (DC), a battery connected to the solar charge controller, and a bi-directional battery inverter connected to the battery for supplying a direct current (DC) to be converted to alternate current (AC), wherein the battery inverter is separately connected to a bi-directional grid/generator and a uni-directional switchboard for supplying alternate current (AC), the switchboard supplies alternate current (AC) and is connected to an electrical equipment, and the battery inverter and the battery supply bi-directional direct current (DC). The aforementioned conventional power systems require to convert direct current (DC) to alternate current (AC) for several times and then convert alternate current (AC) to direct current (DC). In details, the solar photovoltaic inverter is used to convert direct current (DC) to alternate current (AC), and the bi-directional inverter is connected to the grid to supply alternate current (AC) bi-directionally and the battery is provided to convert direct current (DC) bi-directionally. Both conventional power systems need the conversion process to supply direct current (DC) to be fed to the battery and the grid or generator is used to supply alternate current (AC) to be fed to the battery inverter of the electrical equipment, and these conventional power systems need to convert direct current (DC) to alternate current (AC) and then convert alternate current (AC) to direct current (DC) again, and such conversions will lower the overall efficiency and cause losses. These systems and the grid or the grid/generator are bi-directional, thus leading to backflows and damages to power distribution system and equipment, and the need of boosting the voltage. Therefore, these conventional power systems have the disadvantages of complicated structure, too-many conversion process equipment and high cost, and reduction of the practical use.

To achieve the aforementioned and other objectives, this disclosure provides green power system, and the green power system includes: at least one solar panel; an auto-switch, uni-directionally connected to the solar panel; a grid/generator, uni-directionally connected to the auto-switch; and at least one equipment with AC/DC uni-directionally connected to the auto-switch.

In this disclosure, the auto-switch includes but not limiting to a diode, a relay, a metal oxide semiconductor (MOS), a silicon carbide (SiC) semiconductor, and an insulated gate bipolar transistor (IGBT).

In this disclosure, the equipment with AC/DC is integrated with the auto-switch.

In this disclosure, the auto-switch is bi-directionally and electrically connected to a solar charge controller and the solar charge controller is bi-directionally and electrically connected to at least one power storage device.

In this disclosure, the auto-switch is integrated into the AC/DC rectifier.

In this disclosure, a solar charge controller is bi-directionally and electrically connected between the solar panel and the auto-switch, and the solar charge controller is bi-directionally and electrically connected to at least one power storage device.

In this disclosure, the equipment with AC/DC is bi-directionally and electrically connected to a solar charge controller, and the solar charge controller is bi-directionally and electrically connected to at least one power storage device.

In this disclosure, the auto-switch is connected to a sensor and a gateway, and all data sensed by the sensor are transmitted to a server capable of finding out an optimal solar energy utilization solution by a remote user through an internet of things (IOT).

In this disclosure, the power storage device includes but not limited to a physical power storage devices, an electromagnetic power storage devices and an electrochemical storage devices.

In this disclosure, the AC/DC rectifier includes but not limited to a passive rectifier, an active rectifier, integrated power module (IPM), etc.

Compared to the related art, this disclosure includes the solar panel, the auto-switch, the grid/generator, the equipment with AC/DC which are connected to one another. The solar charge controller is bi-directionally connected between the auto-switch or the solar panel and the auto-switch or installed to the equipment with AC/DC, the solar charge controller is connected to the power storage devices to constitute this disclosure. The green power system of this disclosure requires no solar inverter (Photovoltaic Inverter, PV inverter), but directly feeds the direct current (DC) of the solar panel to the equipment with AC/DC, so that it is not necessary to convert direct current (DC) to alternate current (AC) or convert alternate current (AC) to direct current (DC), and this disclosures has the advantageous effects of improving efficiency, simplifying system equipment, saving a plurality of conversion procedures, lowering cost, providing high power storage efficiency and expanding industrial application. In addition, this disclosure is novel and inventive.

DETAILED DESCRIPTION OF THE PREFERRED EMBODIMENTS

The objectives, technical contents and features of this disclosure will become apparent in the following detailed description of the preferred embodiments with reference to the accompanying drawings. It is noteworthy that the drawings used in the specification and subject matters of this disclosure are intended for illustrating the technical characteristics of this disclosure, but not necessarily to be drawn according to actual proportion and precise configuration. Therefore, the scope of this disclosure should not be limited to the proportion and configuration of the drawings.

With reference to FIGS. 3 to 7 for the four architectural diagrams and a block diagram of a green power system with an energy storage system of this disclosure respectively, the green power system 3 of a preferred embodiment includes at least one solar panel 31, an auto-switch 32, a grid/generator 33, and at least one equipment with AC/DC 34.

Figure 3:
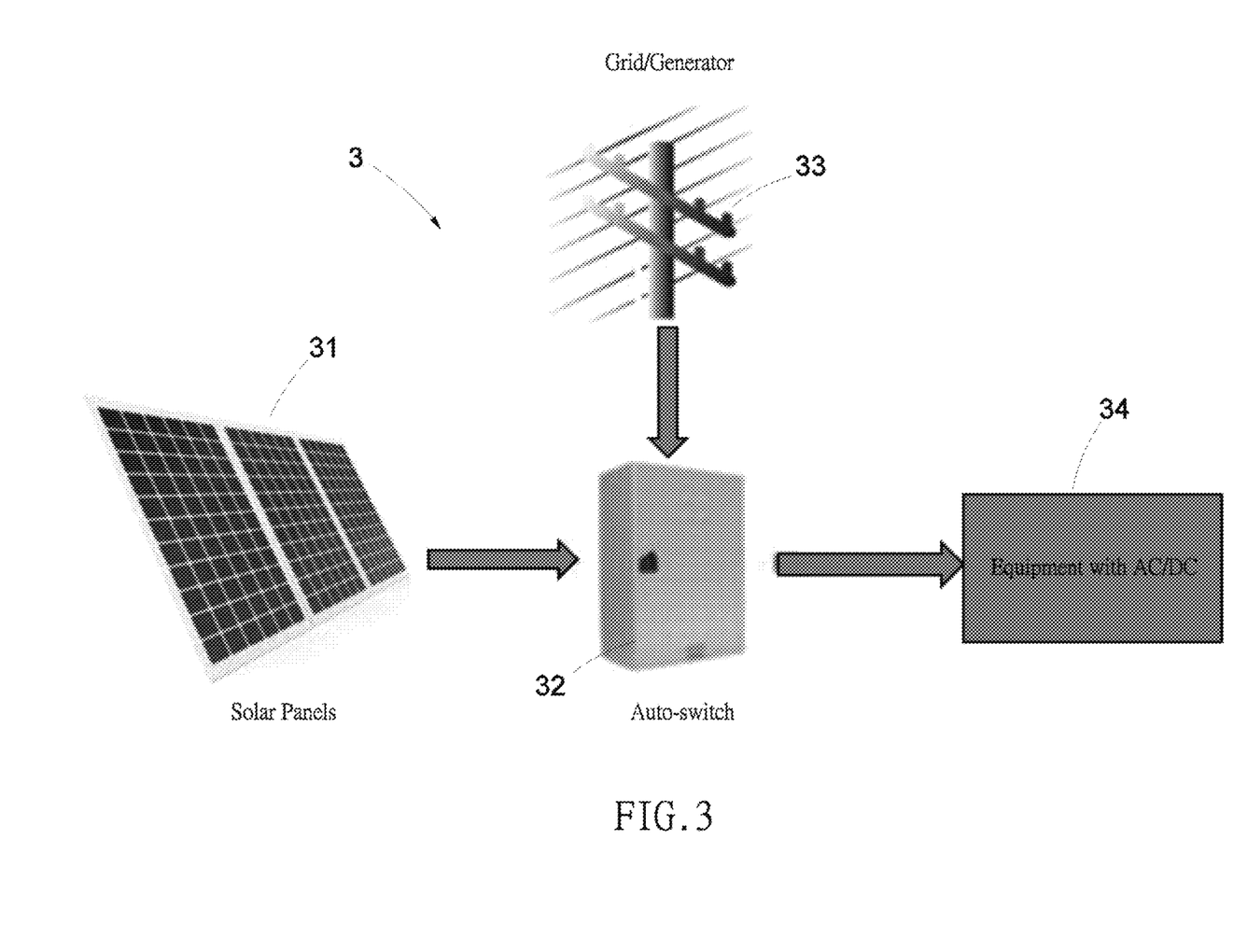
FIG. 3 is an architectural diagram of this disclosure.

The at least one solar panel 31 is provided for converting sunlight into small units of direct current (DC) power, and then integrating the small units of the power into a large unit of usable power.

The auto-switch 32 is uni-directionally connected to the solar panel 31.

The grid/generator 33 is uni-directionally connected to the auto-switch 32.

The at least one equipment with AC/DC 34 is uni-directionally connected to the auto-switch 32; and the equipment with AC/DC 34 directly uses the direct current (DC) supplied by the solar panel 31 through the auto-switch 32. When the electric power supplied by the solar panel 31 is insufficient, the auto-switch 32 switches the system to use the utility power of the grid/generator 33 as the supply for the equipment with AC/DC 34, and thus saving many equipment and processes of converting alternate current (AC) to direct current (DC) or converting direct current (DC) to alternate current (AC). Moreover, these conversions are uni-directional, the grid/generator 33 or grid system provided for supplying alternate current (AC) will not be damaged easily.

In this disclosure, the auto-switch 32 includes but not limited to a diode, a relay, a MOS, a SIC, an IGBT, etc. which can be integrated into an AC/DC rectifier. The AC/DC rectifier includes but not limited to a passive rectifier, an active rectifier, an integrated power module (IPM), etc. The equipment with AC/DC 34 can be integrated with the auto-switch, which is a general electrical equipment in this embodiment and can convert alternate current (AC) to direct current (DC) or be used directly on equipment that uses direct current (DC) such as a computer, a lightbulb, an LED lamp, etc. If the electrical equipment is a pure alternate current (AC) motor, then it will be necessary to install an inverter. Since the future trend is to save energy, the alternate current (AC) motor will be substituted by a high-efficiency DC brushless motor.

Figure 4:
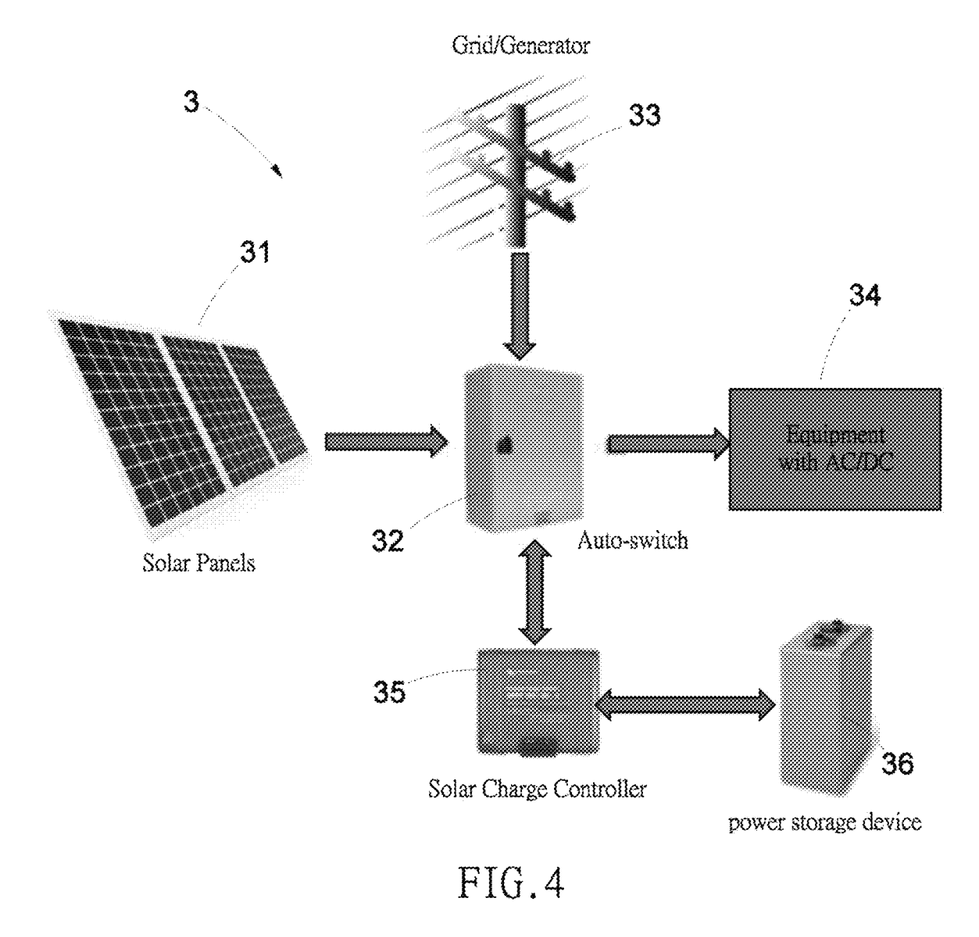
FIG. 4 is an architectural diagram of this disclosure with an energy storage system.

With reference to FIG. 4 for the architectural diagram of this disclosure having an energy storage system, the green power system 3 includes at least one solar panel 31; an auto-switch 32 uni-directionally connected to the solar panel 31, a grid/generator 33 uni-directionally connected to the auto-switch 32, and at least one equipment with AC/DC 34 uni-directional connected to the auto-switch 32. In this disclosure, the auto-switch 32 is bi-directionally and electrically connected to a solar charge controller 35, and the solar charge controller 35 is bi-directionally and electrically connected to at least one power storage device 36. When the direct current (DC) supplied by the solar panel 31 is insufficient, the grid/generator 33 will switch to the power supply from the grid/generator 33 through the auto-switch 32 or switch to the power supply from the power storage device 36. If the grid/generator 33 is not present, the power storage device 36 will supply power, and the power storage device 36 includes but not limited to a physical power storage devices, an electromagnetic power storage devices, an electrochemical power storage devices, etc.

In this disclosure, the auto-switch 32, the solar panel 31 and the grid/generator 33 are related to the equipment with AC/DC 34 and provided for supplying electric power to the equipment with AC/DC 34 when the direct current (DC) power supplied by the solar panel 31 is insufficient. When the direct current (DC) power supplied by the solar panel 31 is sufficient, the electrical equipment is completely powered by the solar panel 31, and the excess part of the solar energy will be stored through the charge of the solar charge controller 35. For example, if the power supplied by the solar panel 31 is insufficient for the use by the equipment with AC/DC 34, the insufficient part of power is supplied by the grid/generator 33 of utility power or supplied by the power storage device 36 of the battery. The power storage device 36 can also be charged by the solar charge controller 35 provided by the grid/generator 33. The solar charge controller 35 with the architecture as shown in FIG. 4 is a power storage device with the concept of centralized power supply shared by all equipment.

Figure 5:
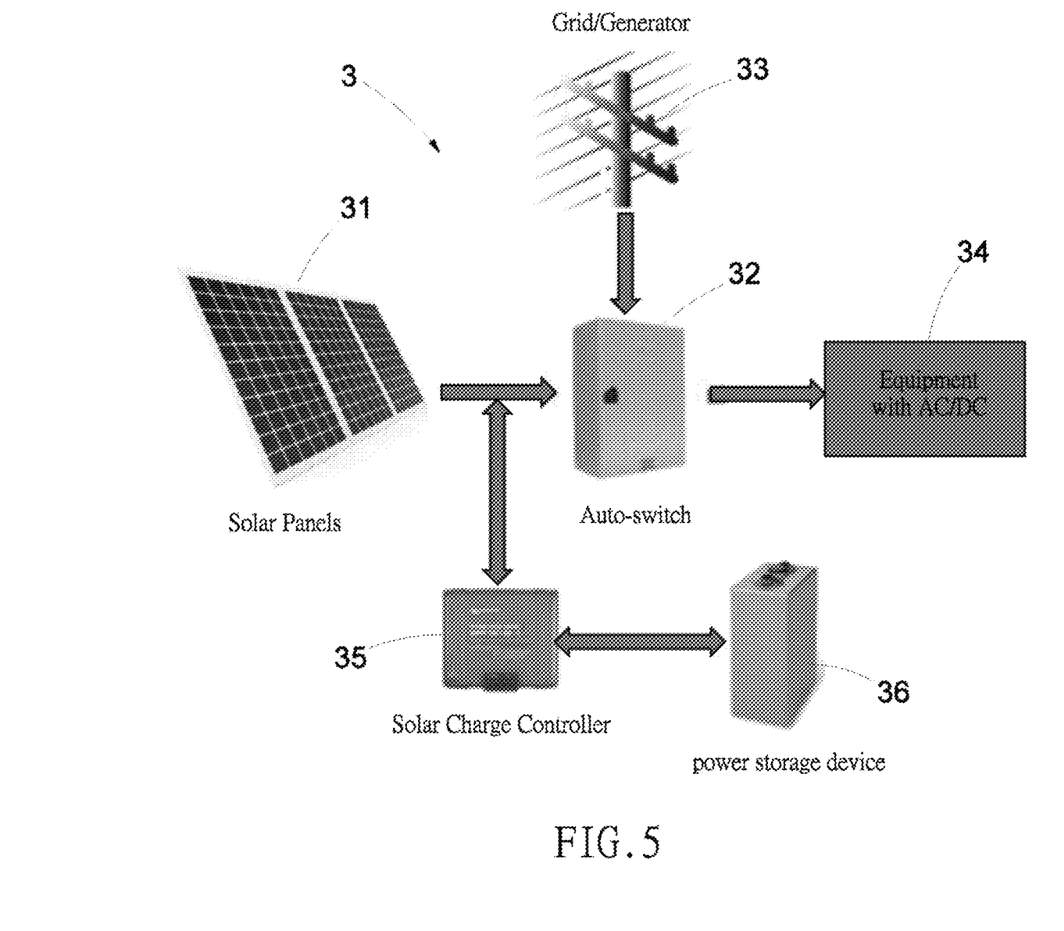
FIG. 5 is an architectural diagram of another embodiment of this disclosure with an energy storage system.

With reference to FIG. 5 for the architectural diagram of another embodiment of this disclosure having an energy storage system, the green power system 3 includes at least one solar panel 31; an auto-switch 32 uni-directionally connected to the solar panel 31, a grid/generator 33 is uni-directionally connected to the auto-switch 32, and at least one equipment with AC/DC 34 uni-directionally connected to the auto-switch 32. In the architecture of this disclosure as shown in FIG. 5, a solar charge controller 35 is bi-directionally and electrically connected between the solar panel 31 and the auto-switch 32, and the solar charge controller 35 is bi-directionally and electrically connected to at least one power storage device 36. In this embodiment, the solar charge controller 35 is also a power storage device with the concept of centralized power supply shared by all equipment.

Figure 6:
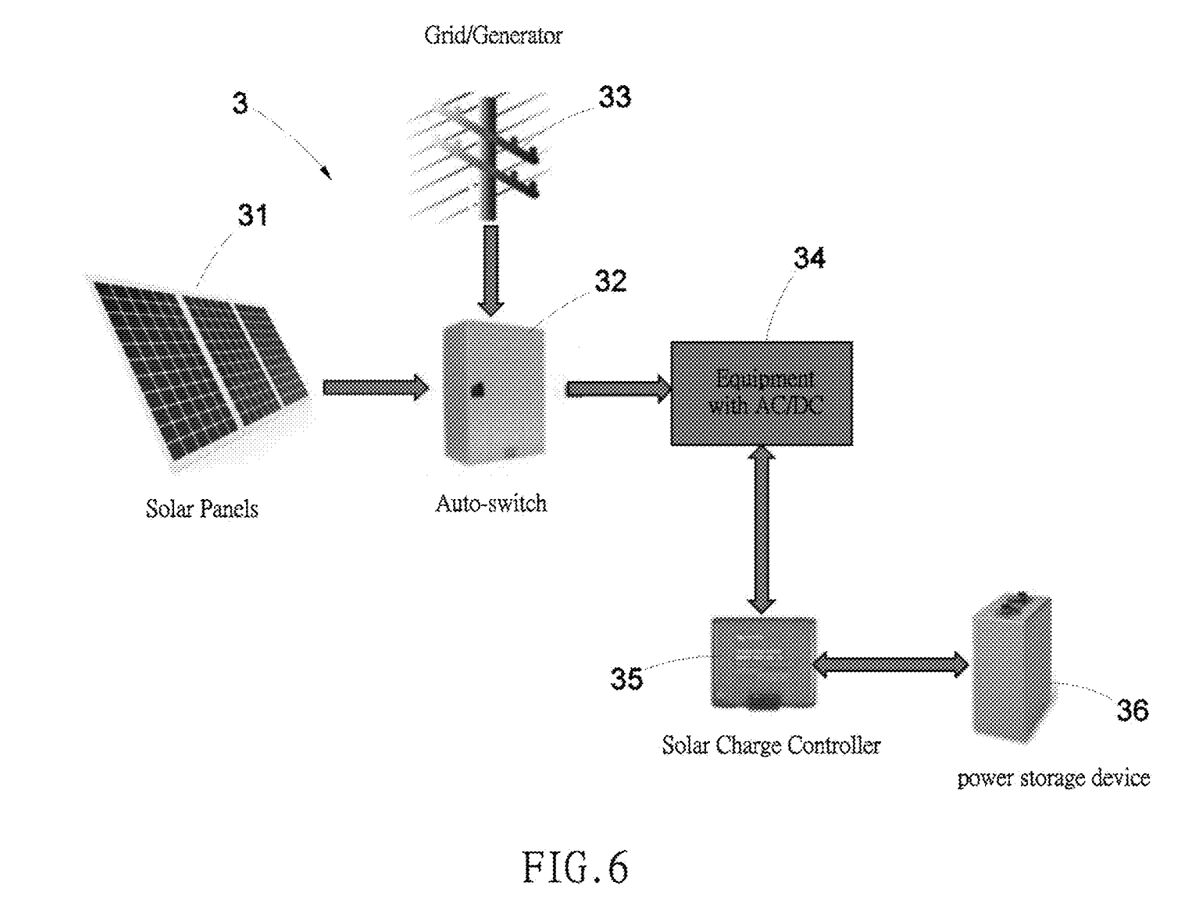
FIG. 6 is an architectural diagram of a further embodiment of this disclosure with an energy storage system.

With reference to FIG. 6 for the architectural diagram of a further embodiment of this disclosure having an energy storage system, the green power system 3 includes at least one solar panel 31, an auto-switch 32 uni-directionally connected to the solar panel 31, a grid/generator 33 uni-directionally connected to the auto-switch 32, and at least one equipment with AC/DC 34 uni-directionally connected to the auto-switch 32. In the architecture of this disclosure as shown in FIG. 6, the equipment with AC/DC 34 is bi-directionally and electrically connected to a solar charge controller 35, and the solar charge controller 35 is bi-directionally and electrically coupled to at least one power storage device 36, and the solar charge controller 35 is connected to the grid/generator 33 through the auto-switch 32 or is provided for charging and storing energy to the power storage device 36 by the solar panel 31. In this embodiment, the solar charge controller 35 is a power storage device with the concept of decentralized power supply, for example, some more important emergency equipment can rely on their own power storage system and not share the power with other unimportant equipment.

Figure 7:
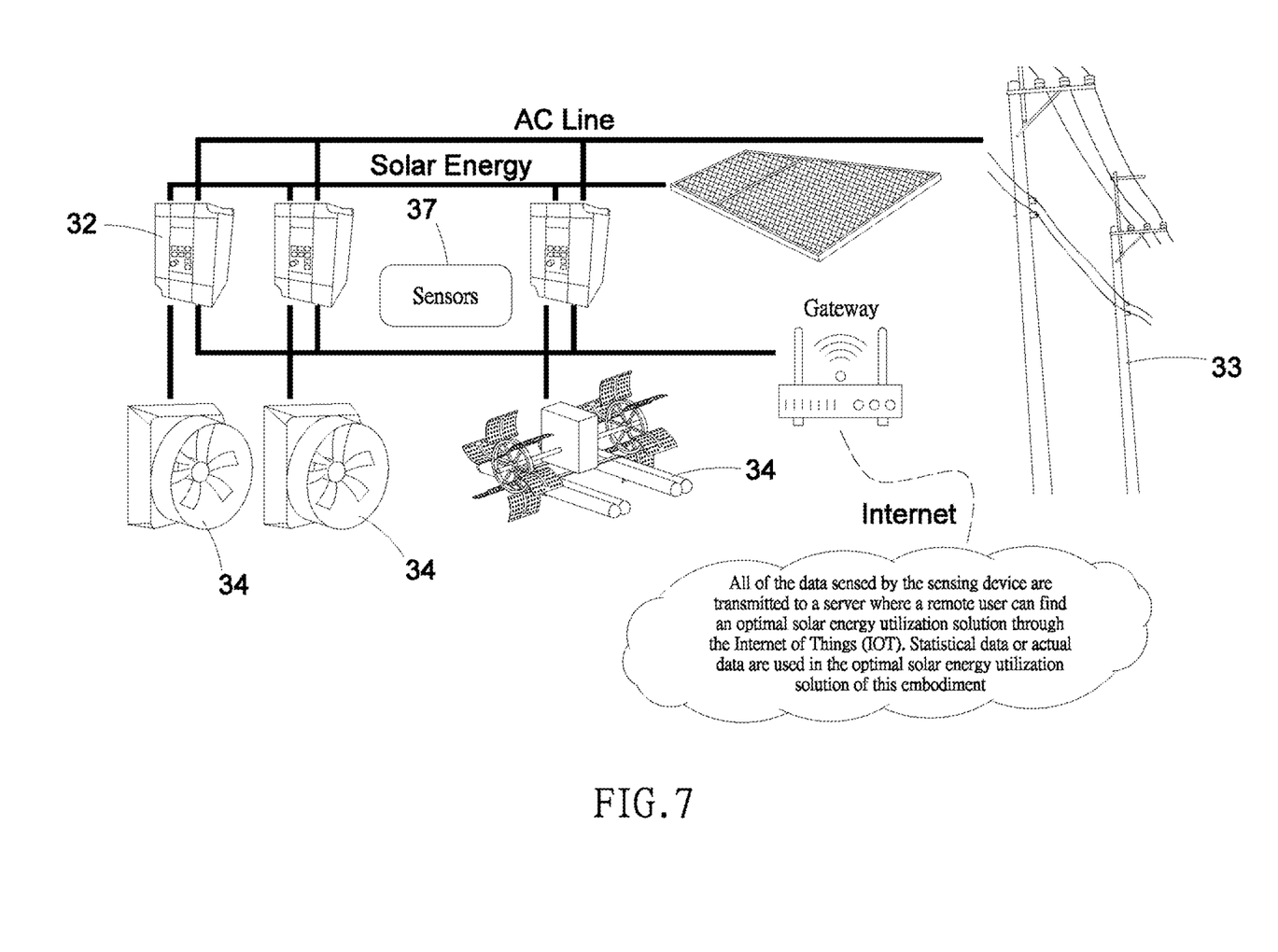
FIG. 7 is a block diagram of this disclosure.

With reference to FIG. 7 for the block diagram of a green power system in accordance with this disclosure, an end of a plurality of auto-switches 32 is connected to supply direct current (DC) to the solar panel 31 of the auto-switch 32 and alternate current (AC) to the grid/generator 33 of the auto-switch 32, and each auto-switch 32 supplies electric power to each corresponding equipment with AC/DC 34. In this disclosure, each of the auto-switches 32 is connected to a sensing device 37 and a gateway 38, and all of the data sensed by the sensing device 37 are transmitted to a server where a remote user can find an optimal solar energy utilization solution through the Internet of Things (IOT). Statistical data or actual data are used in the optimal solar energy utilization solution of this embodiment, but this disclosure is not limited to such arrangement.

In addition, this disclosure can be applied to a power jack on the wall and change the power jack into a green power jack which can be switched to the power supply of direct current (DC) or the power supply of multiple direct currents (DC). Therefore, the power jack of the equipment with AC/DC 34 can have the power supply of direct current (DC) and alternate current (AC). If the power supply is finally developed to the one that just needs to keep the higher-efficiency direct current (DC) only, the direct current (DC) feed input can be added to the power supply device in the future.

Compared to the related art, this disclosure includes the solar panel 31, the auto-switch 32, the grid/generator 33, and the equipment with AC/DC 34 which are connected to one another. The solar charge controller 35 is bi-directionally connected between the auto-switch 32 or the solar panel 31 and the auto-switch 32 or installed to the equipment with AC/DC 34, the solar charge controller 35 is connected to the power storage device 36 to constitute this disclosure. The green power system of this disclosure requires no solar inverter (Photovoltaic Inverter, PV inverter), but directly feeds the direct current (DC) of the solar panel 31 to the equipment with AC/DC 34, so that it is not necessary to convert direct current (DC) to alternate current (AC) or convert alternate current (AC) to direct current (DC), and this disclosures has the advantageous effects of improving efficiency, simplifying system equipment, saving a plurality of conversion procedures, lowering cost, providing high power storage efficiency and expanding industrial application. In addition, this disclosure is novel and inventive.

In summation of the description above, this disclosure breaks through the related art and definitely achieves the desired improvement, and the disclosure is non-obvious, novel, and inventive, and complies with the patent application requirements, and thus is duly filed for patent application.

While the disclosure has been described by means of specific embodiments, it is to be understood that the disclosure is not limited thereto. To the contrary, numerous modifications and variations could be made thereto by those skilled in the art without departing from the scope and spirit of the disclosure set forth in the claims.

What is claimed is:

1. A green power system, comprising:
   at least one solar panel;
   an auto-switch, uni-directionally coupled to the solar panel;
   a grid/generator, uni-directionally coupled to the auto-switch; and
   at least one equipment with AC/DC, uni-directionally coupled to the auto-switch;
   wherein the auto-switch which is bi-directionally and electrically coupled to a solar charge controller bi-directionally and electrically coupled to at least one power storage device; wherein the equipment with AC/DC is integrated with the auto-switch, and the auto-switch has two functions, one function is to convert AC to DC, and the other function is to switch between solar power supply and DC power supply automatically.

2. The green power system according to claim 1, wherein the auto-switch includes but not limiting to one selected from the group consisting of a diode, a relay, a metal oxide semiconductor (MOS), a silicon carbide (SiC) semiconductor, and an insulated gate bipolar transistor (IGBT).

3. The green power system according to claim 1, wherein the auto-switch is integrated into the AC/DC rectifier.

4. The green power system according to claim 1, further comprising a solar charge controller bi-directionally and electrically coupled between the solar panel and the auto-switch, and the solar charge controller being bi-directionally and electrically coupled to at least one power storage device.

5. The green power system according to claim 1, wherein the equipment with AC/DC is bi-directionally and electrically coupled to a solar charge controller, and the solar charge controller is bi-directionally and electrically coupled to at least one power storage device.

6. The green power system according to claim 1, wherein the auto-switch is coupled to a sensor and a gateway, and all data sensed by the sensor are transmitted to a remote server capable of finding out an optimal solar energy utilization solution by a user via an internet of things (IoT).

7. The green power system according to claim 1, wherein the power storage device is but not limited to a physical power storage devices, an electromagnetic power storage devices and an electrochemical storage devices.

8. The green power system according to claim 3, wherein the AC/DC rectifier includes but not limiting to a passive rectifier, an active rectifier, an integrated power module (IPM).

9. The green power system according to claim 2, wherein the auto-switch is coupled to a sensor and a gateway, and all data sensed by the sensor are transmitted to a remote server capable of finding out an optimal solar energy utilization solution by a user via an internet of things (IoT).

10. The green power system according to claim 1, wherein the auto-switch is coupled to a sensor and a gateway, and all data sensed by the sensor are transmitted to a remote server capable of finding out an optimal solar energy utilization solution by a user via an internet of things (IoT).

11. The green power system according to claim 3, wherein the auto-switch is coupled to a sensor and a gateway, and all data sensed by the sensor are transmitted to a remote server capable of finding out an optimal solar energy utilization solution by a user via an internet of things (IoT).

12. The green power system according to claim 4, wherein the auto-switch is coupled to a sensor and a gateway, and all data sensed by the sensor are transmitted to a remote server capable of finding out an optimal solar energy utilization solution by a user via an internet of things (IoT).

13. The green power system according to claim 5, wherein the auto-switch is coupled to a sensor and a gateway, and all data sensed by the sensor are transmitted to a remote server capable of finding out an optimal solar energy utilization solution by a user via an internet of things (IoT).

14. The green power system according to claim 4, wherein the power storage device is but not limited to a physical power storage devices, an electromagnetic power storage devices and an electrochemical storage devices.

15. The green power system according to claim 5, wherein the power storage device is but not limited to a physical power storage devices, an electromagnetic power storage devices and an electrochemical storage devices.

* * * * *